United States Patent [19]

Toda

[11] Patent Number: 4,781,440
[45] Date of Patent: Nov. 1, 1988

[54] STEREOSCOPIC OPTICAL INSTRUMENTS UTILIZING LIQUID CRYSTAL

[75] Inventor: Akitoshi Toda, Hachioji, Japan

[73] Assignee: Olympus Optical Company Ltd., Japan

[21] Appl. No.: 931,427

[22] Filed: Nov. 17, 1986

[30] Foreign Application Priority Data

Nov. 29, 1985 [JP] Japan ................................. 60-268904

[51] Int. Cl.$^4$ ............................................... G02F 1/13
[52] U.S. Cl. ............................ 350/347 V; 350/331 R; 350/347 E; 350/347 R
[58] Field of Search .......... 350/347 E, 347 V, 347 R, 350/331 R, 348, 349

[56] References Cited

U.S. PATENT DOCUMENTS

| | | | |
|---|---|---|---|
| 2,789,462 | 7/1953 | Forgrave | 350/396 |
| 4,037,929 | 7/1977 | Bricot et al. | 350/347 V |
| 4,152,846 | 5/1979 | Witt | 350/331 R |
| 4,190,330 | 2/1980 | Berreman | 350/331 |
| 4,300,818 | 11/1981 | Schachar | 350/347 V |
| 4,462,661 | 7/1984 | Witt | 350/332 |
| 4,572,616 | 2/1986 | Kowel et al. | 350/347 V |

OTHER PUBLICATIONS

Kowel et al. "A Liquid Crystal Adaptive Lens", The U.S. Army Night Vision and Electro Optics Laboratory, Virginia, 1981.

*Primary Examiner*—John S. Heyman
*Assistant Examiner*—Huy V. Mai
*Attorney, Agent, or Firm*—Louis Weinstein

[57] ABSTRACT

A stereoscopic optical instrument employing liquid crystal lenses such as a pair of spectacles and stereoscopic optical devices has a construction in which left and right liquid crystal lenses are incorporated thereinto such that liquid crystal molecular directors within the lenses are in mirror symmetry with respect to a plane of symmetry which passes through the middle point of the center line connecting the centers of both the lenses and whose normal is the center line.

8 Claims, 7 Drawing Sheets

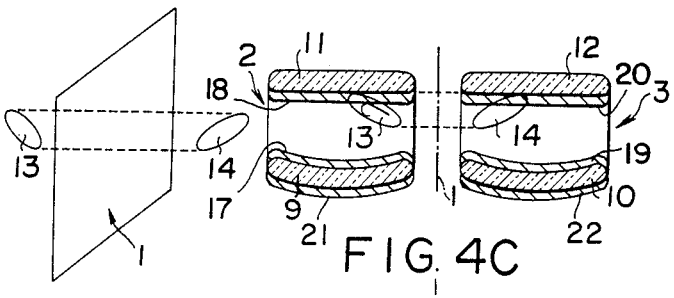
FIG. 4A   FIG. 4B
FIG. 4C
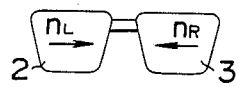
FIG. 5A
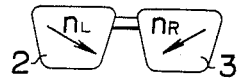
FIG. 5B
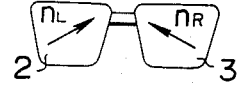
FIG. 5C

STEREOSCOPIC OPTICAL INSTRUMENTS UTILIZING LIQUID CRYSTAL

BACKGROUND OF THE INVENTION

The present invention relates to stereoscopic optical instruments utilizing a liquid crystal, and more particularly, to a liquid crystal director of each of liquid crystal lenses for use in a pair of spectacles and stereoscopic optical apparatus.

The concept of making a lens variable in its focal length utilizing the double refraction of liquid crystal is found in, for example, Japanese Laid-Open Patent Publication Nos. Sho 52/1977-32348, Sho 54/1979-99654 and Sho 58/1983-50339. The application of this concept to spectacles is also indicated in the latter two publications. An example of such conventional lenses employing a liquid crystal (hereinafter referred to as a liquid crystal lens) will be described with reference to a section view of FIG. 15 and a plan view of FIG. 16.

Transparent conductive layers 23 and 24 are provided respectively on a spherical concave lens 21 and a flat glass plate 22. Liquid crystal 26 is enclosed within the space which is formed by joining the conductive layers 23, 24 together through an insulating layers 25 to form a liquid crystal lens 20.

An a.c. voltage from an a.c. power source 27 is applied between the conductive layers 23, 24. When no a.c. voltage is applied, the orientation treatment is applied to the liquid crystal 26 so that its liquid crystal molecules are in the same direction and the liquid crystal molecules in FIGS. 15 and 16 are thus in homogeneous orientation.

When a voltage is applied to the liquid crystal lens 20, molecules of the liquid crystal 26 in the lens 20 rotate so as to orient their longitudinal axis to the direction of the electric field in the case that the dielectic anisotropy of the liquid crystal is positive. Then, when the liquid crystal 20 having a director of liquid crystal molecules which is shown with an arrow n in FIG. 16 is combined with a polarization plate 28 as shown in FIG. 17, so as to allow only extraordinary rays to impinge on the liquid crystal lens 20, the liquid crystal 26 varies from its refractive index to an extraordinary ray $n_e$ to its refractive index to an ordinary ray $n_o$ as liquid crystal molecules within the liquid crystal 20 rotate by the electric field. Now, assuming that a focal length is f, a refractive index is n and radii of curvature of opposite surfaces of a lens are $r_1$ and $r_2$, a focal length of a lens is generally shown as follows:

$$\frac{1}{f} = (n-1)\left(\frac{1}{r_1} - \frac{1}{r_2}\right)$$

so that it is possible to change the focal length by changing a refractive index n.

With the liquid crystal 20 applied to spectacles, it is possible to continuously change focal length, so that it is greatly useful to those who the focus adjusting function is lowered by presbyopia or is lost by an operation of taking out the eye lens due to cataract.

Such liquid crystal spectacles employing the above conventional liquid crystal lens have disadvantages, however, that it is difficult to adjust the focus or that left and right lenses vary in their changing rates of focal length, thus lacking thoughtful consideration in the human engineering.

This fact will be described hereinafter in detail. A liquid crystal is generally provided with the orientation treatment so as to orient its liquid crystal molecules to a specific direction even before a voltage is applied thereto. The orientation treatment is performed by a rubbing operation with a high polymer film, such as polyimide, polyvinyl alcohol or the like so as to turn to a particular direction or by evaporating $SiO_2$, $MgO$, $MgF_2$, Au or the like from the diagonal direction to the surface of the liquid crystal. As a result, as shown in FIG. 16, the liquid crystal lens 20 becomes an element in which directors of the liquid crystal are oriented to a direction shown with an arrow n.

With a pair of liquid crystal spectacles 30 employing the liquid crystal lens 20, as shown in FIG. 18, in which left and right liquid crystal lenses 31, 32 are incorporated into a spectacle frame so that their respective directors $n_L$ and $n_R$ intersect at right angles, even though voltages from a drive power source 33 to be applied to the lenses 31 and 32 are the same, their focal lengths are different, so that the spectacles 30 are inconvenient to see. Even when the voltages are changed in a similar way, the lens 31, 32 disadvantageously yield their different change rates in focal length.

Such disadvantages are caused, as shown in FIG. 19, by the existence of a pupil distance PD for obtaining stereoscopic vision in human eyes 35, 36 since views through the eyes 35, 36 are different and the difference in projecting rays of light upon the liquid crystal lenses 31, 32 is caused. Further viewing these facts minutely with reference to FIGS. 20A, B and C, the difference in projecting rays of light upon the liquid crystal lens 31, 32 can be regarded as the difference in those upon the liquid crystal molecules. FIGS. 20A and B are top views of the liquid crystal spectacles. FIG. 20C is a front view thereof. Taking the pillar-shaped liquid crystal molecules 37, 38 into consideration by substituting them for the refractive index ellipsoid of the liquid crystal, the liquid crystal 37 within the left eye liquid crystal lens 31 makes an angle $\theta_L$ with a light ray incident upon the liquid crystal lens from an object, as shown in FIG. 20A, and an angle $\theta_R$ between the liquid crystal molecule 38 within the right liquid crystal lens 32 and incident light thereupon is 90°, as shown in FIGS. 20B and C. Thus, since $\theta_L$ is not equal to $\theta_R$, the light incident angles to the corresponding refractive index ellipsoids of the liquid crystal lenses 31, 32 are different and hence the lenses 31, 32 yield different infractive indexes.

In other words, even when an object on the extension of the center line of a human body is viewed (front view), the liquid crystal lenses 31, 32 cause the difference in focal length between them to be out of focus.

While the foregoing describes the case where the liquid crystals of the liquid crystal lenses 31, 32 are merely subjected to the initial orientation treatment without applying a voltage thereto, when a voltage is applied they cause the difference in change rate of their refractive indexes, thereby further increasing the difficulty in viewing and in focusing.

OBJECT AND SUMMARY OF THE INVENTION

It is an object of the present invention to provide a stereoscopic optical instrument which utilizes a liquid crystal lens designed in accordance with the human engineering.

It is another object of the present invention to provide a stereoscopic optical instrument in which left and right liquid crystal lenses are incorporated into an optical instrument such as a pair of spectacles, in such a manner that liquid crystal molecular directors of the liquid crystal lenses are in mirror symmetry with respect to a plane passing through the middle of the center line which connects the left and right liquid crystal lenses, and which is the normal line of the plane.

According to the present invention, spectacles and stereospcopic optical instruments are constructed with such arrangement of the liquid crystal lenses, so that it is possible to eliminate the difference in change rate of focal length between left and right liquid crystal lenses with the same voltage applied thereto and to obtain optical instruments in which the left and right lenses are in well adjusted condition.

BRIEF DESCRIPTION OF THE DRAWINGS

FIGS. 4A, B and C are diagrams showing symmetricalness of liquid crystal molecules within left and right liquid crystal lenses of the spectacles shown in FIG. 1;

FIGS. 5A, B and C are diagrams showing combinations of liquid crystal directors of left and right liquid crystal lenses of the spectacles shown in FIG. 1;

DETAILED DESCRIPTION OF PREFERRED EMBODIMENTS

Figure 1:
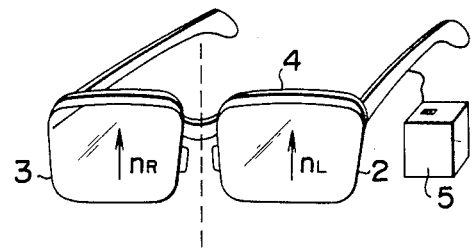
FIG. 1 is a perspective view of an embodiment of liquid crystal spectacles according to the present invention.
Figures 2A, 2B:
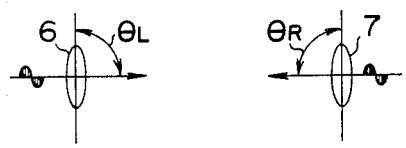
FIGS. 2A and B are diagrams showing relations between liquid crystal molecules within left and right liquid crystal lenses of the spectacle shown in FIG. 1.
Figure 18:
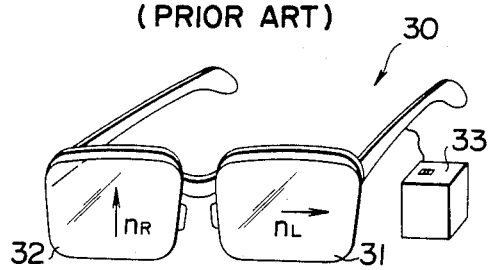
FIG. 18 is a perspective view of liquid crystal spectacles employing the liquid crystal lens shown in FIG. 15.
Figure 19:
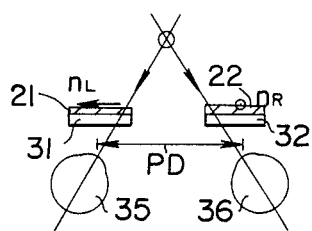
FIG. 19 is a diagram for explaining relations between directors of left and right liquid crystal lenses and an incident light ray.
Figure 20A:
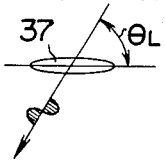
FIGS. 20A, B and C are diagrams showing relations between liquid crystal molecules within left and right liquid crystal lenses shown in FIG. 19 and an incident light ray.
Figure 20B:
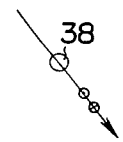
Figure 20C:
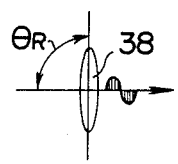

An embodiment of liquid crystal spectacles according to the present invention will be described hereinafter with reference to FIGS. 1 to 13. Compared with the conventional spectacles shown in FIG. 18 and described above, the present invention has a pair of left and right liquid crystal lenses 2, 3 which are in symmetry with respect to the center of the spectacles in a manner that directions of directors of liquid crystal molecules within the lenses 2, 3 are shown by "$n_L$" and "$n_R$". In other words, the lenses 2, 3 are incorporated into a frame 4 in such a manner that the directors of liquid crystals are in symmetry with respect to the center line of the frame 4 which is shown in FIG. 1 by a dotted line corresponding to the center line of a face. With such arrangement of the liquid crystal lenses 2, 3, considering it in a manner similar to the conventional one shown in FIG. 19, relations between liquid crystal molecules 6, 7 within the lenses 2, 3 and an incident light ray is $\theta_L = \theta_R$ as shown in FIGS. 2A and B and the refractive indexes of the lenses 2, 3 are equal.

In addition, the changes in the refractive indexes of the lenses 2, 3 are equal while a voltage from a drive voltage 5 is applied to the lenses 2, 3 and a failure in focusing can be prevented. Consequently, the object of the present invention can be achieved with the above embodiment by constituting it so that the directions of liquid crystal directors of the lenses 2, 3 are symmetrical with respect to the center of the frame 4.

Though, as such, it is possible to equalize the properties of the lenses 2, 3, it is necessary further to consider the properties in three dimensions when liquid crystals within the lenses 2, 3 have a pretilt angle.

Figures 3A, 3B:
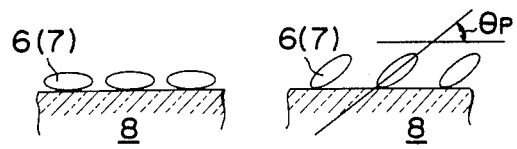
FIGS. 3A and B are diagrams showing conditions when liquid crystal molecules have their pretilt angle and when they have no pretilt angle.

Specifically, when a liquid crystal cell or a liquid crystal lens are formed, an orientation treatment is generally applied to a substrate or a substrate lens 8 in order to allow a stable action of liquid crystals. With the orientation treatment, it is possible to allow the liquid crystals to have a pretilt angle $\theta_P$, as shown in FIG. 3B. FIG. 3A shows the condition where no pretilt angle is given.

The method is to intentionally give a pretilt angle, since liquid crystal molecules with a pretilt angle have their predetermined direction to move when an electric field is applied thereto and also have a more stable action, so that the method is commonly used in a display with liquid crystals.

When such an orientation treatment is applied to liquid crystal spectacle lenses, a pretilt angle $\theta_P$ should be considered in order to eliminate the disagreement in focal length between the lenses 2, 3.

In the present invention, directions of liquid crystal molecular directors in the lenses 2, 3 are set in such a manner that the left and right lenses are in symmetry, taking a pretilt angle of the liquid crystal into consideration. The symmetricalness of liquid crystal molecules 13, 14 within left and right liquid crystal lenses 2, 3 is shown in FIGS. 4A, B and C: a perspective, transverse sectional and front view, respectively. The lenses 2, 3 include liquid crystals with a pretilt angle which are enclosed within a pair of cells respectively formed between front spherical lenses 9, 10 and substrates 11, 12.

The interior surfaces of lenses 9 and 11 are provided with transparent conductive layers 17 and 18 respectively. Similarly the interior surfaces of lenses 10 and 12 are provided with transparent conductive layers 19 and 20. The exterior surfaces of lenses 9 and 10 are provided with polarizing layers 21 and 22 respectively. The liquid crystal molecule 13 is within the left lens 2 and the liquid crystal molecule 14 is within the right lens 3. Thus a pair of spectacles are constructed by a pair of liquid crystal lenses 2, 3 which are arranged in such a manner that the left and right liquid crystal molecules 13, 14 are in symmetry with respect to a symmetrical plane 1 located at the center therebetween. As a result, it is possible to equalize the properties of the lenses 2, 3 and to eliminate disadvantages such as out of focus, different change rates in focal length with a voltage applied, or the like.

Figure 6:
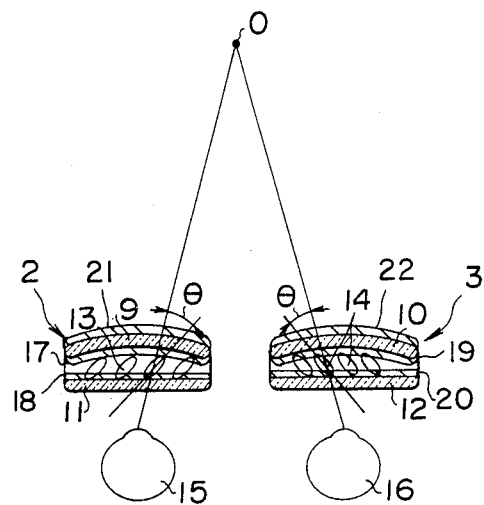
FIG. 6 is a sectional top view of the liquid crystal spectacles shown in FIGS. 5A, B and C.
Figure 7A:
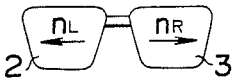
FIGS. 7A, B and C are diagrams showing liquid crystal spectacles having combination of liquid crystal directors of the spectacles different from those shown in FIGS. 5A, B and C.
Figure 7B:
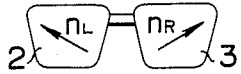
Figure 7C:
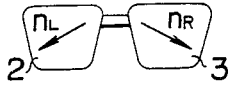
Figure 8:
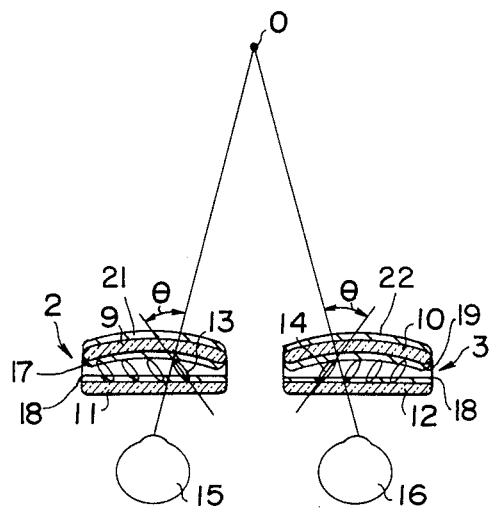
FIG. 8 is a sectional top view of liquid crystal spectacles shown in FIGS. 7A, B and C.
Figure 9:
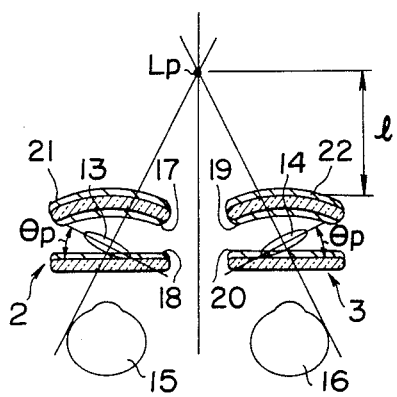
FIG. 9 is a sectional top view of the liquid crystal spectacles shown in FIGS. 7A, B and C for explaining its unstable region.
Figure 10A:
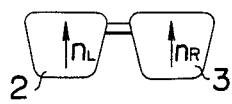
FIGS. 10A and B are diagrams showing combinations of liquid crystal directors different from those of the spectacles shown in FIGS. 5A, B and C and FIGS. 7A, B and C.
Figure 10B:
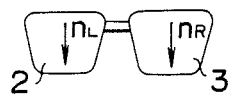

FIGS. 5A, B and C, FIGS. 7A, B and C and, FIGS. 10A and B show relations between the spectacle lenses 2, 3 and directors of their liquid crystal molecules when the liquid crystal molecules are arranged so as to be in mirror symmetry in various modes. The directions shown by arrows indicate those when the liquid crystals within the lenses 2, 3 are viewed from the eyeball sides to the direction going away therefrom. FIG. 6 is a top sectional view of the spectacles shown in FIGS. 5A, B and C and FIG. 8 is a top sectional view of the spectacles shown in FIGS. 7A, B and C. Like elements of FIGS. 4B, 6, 8, 9, 11 and 12 are designated by like numerals.

Considering the structure of eyes, since view lines of a left eye 15 and a right eye 16 are focused at a point O, the eyes are directed to the center sides of the eyes when viewing the front. For example, an operation to gradually focus liquid crystal spectacles whose liquid crystal lenses are convex, from an object in front of eyes to an object in the far distance, may be achieved by increasing a voltage to be applied to the liquid crystal lenses 2, 3 since the liquid crystal normally has a positive anisotropy in refractive index $$(\Delta n = n_e - n_o > 0).$$

Then, the liquid crystal molecules 13, 14 move along an electric field and their focal lengths smoothly increase within an applied voltage when such a remote object that a pretilt angle of the liquid crystal is insignificant is viewed. With the liquid crystal lenses 2, 3, however, in which, as shown in FIGS. 7A, B and C, the liquid crystal molecules 13, 14 are in mirror symmetry and are arranged outwardly from a view line, when the lenses 2, 3 are focused within the scope nearer than a distance l to a point $L_P$ where, as shown in FIG. 9, the normals of the liquid crystal molecules 13, 14 intersect which have their pretilt angles within the lenses 2, 3, it may possibly happen that a voltage should be increased with the decrease of distance.

Consequently, as for the structure of the present invention, the structure shown in FIGS. 5A, B and C is more desirable than that shown in FIGS. 7A, B and C.

However, since there is not, in general, the remotest case of focusing eyes on an object at a distance such as several cm with the normal eyes, the problem is practically inconsiderable even with the liquid crystal spectacle of the structure of a large pretilt angle shown in FIGS. 7A, B and C. Accordingly, it is possible to use the structure shown in FIGS. 7A, B and C as liquid crystal spectacles.

In addition, as shown in FIGS. 10A and B, when liquid crystal molecular directors of the left and right lenses 2, 3 are vertically parallel, their focal lengths increase smoothly with an applied voltage, so that these combinations can be used as the structure of the present invention. However, when a structure is such that the liquid crystal molecular directors are not in parallel but at least either of directions of left and right transmission axes and directions of absorption axes of a polarizing filter are parallel, including the case shown in FIG. 5A and FIG. 7A, problems may possibly occur. A polarizing filter itself is commonly used for various objects other than spectacles, for example, a filter mounted in front of a CRT monitor. Consequently, when an object thus polarized is viewed with liquid crystal spectacles employing the polarizing filter described above, it may occur that when a direction of the polarizing filter used for the liquid crystal lens and that of a polarizing filter of the CRT monitor form a cross-nicol, light rays from the CRT picture are not transmitted through the left and right lenses, so that the picture is not seen. In order to avoid this, namely, in order that light rays always enter from either of the lenses, it is preferred that the directions of the left and right polarizing filters of the left and right liquid crystal lenses are slightly shifted rather than they are completely parallel.

Figure 11:
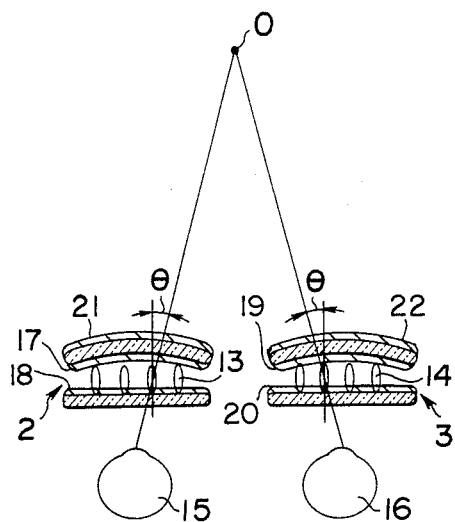
FIG. 11 is a sectional top view of the spectacles shown in FIGS. 10A and B.

As for the "direction" of the polarizing filter, it is possible to consider two directions of the transmission and absorption axis. These two directions intersect at right angles and hence when the left and right lens planes are parallel it may be all right to consider only one of the two axes since when directions of the left and right polarizing filters regarding the one of the two axes are parallel, directions of the filters regarding the other axis are also parallel. However, when the left and right lenses have their planes which are the same planes of their polarizing plates and are not parallel, for example, in FIG. 5A when the two lens planes make a certain angle such that the plane at the nose side tilts upwardly from the sheet plane and the plane at the ear side tilts inversely, the directions of the transmission axes which are in the transverse direction as shown make a certain angle in the same manner as the lens planes, namely, not parallel, while the directions of the absorption axes which are perpendicular to those of the transmission axes are retained in parallel. Thus, there is the case where either pair of the transmission and absorption direction pairs are parallel and therefore it is desirable to set such that neither of the two direction pairs are not parallel in order to avoid the occurrence of the above problem that a picture is not seen. A top view of the spectacles when a voltage is applied thereto is shown in FIG. 11.

Figure 12:
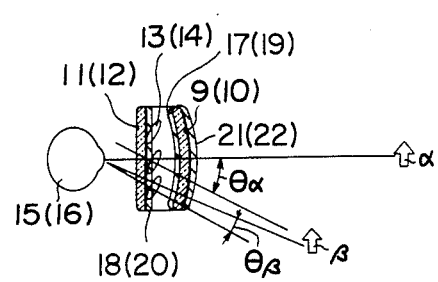
FIG. 12 is a sectional side view of the spectacles shown in FIGS. 10A and B.

FIG. 12 is a side view of the spectacles shown in FIG. 10A. In this case, an angle $\theta_\alpha$ between a line connecting a remote object $\alpha$ to an eye and the normals of the liquid crystal molecules 13, 14 is larger than an angle $\theta_\beta$ between a line connecting a nearer object $\beta$ to the eye and the normals of the molecules 13, 14 ($\theta_\alpha > \theta_\beta$). As a result, the focal length in the $\theta_\beta$ direction is smaller than that in the $\theta_{60}$ direction. In general, when a remote object is viewed, the eye direction is near to the horizontal line and when a near object is viewed, the eye direction comes to the lower side from the horizontal line. Consequently, with the liquid crystal lenses oriented as shown in FIG. 10A, it is possible to adjust the focal length suitable for the eyes even without changing an applied voltage or with a very small voltage, if any.

Furthermore, the present invention is applicable to a liquid crystal lens assembly dispensing with a polarizing plate by superimposing a plurality of liquid crystal lenses.

Figure 13:
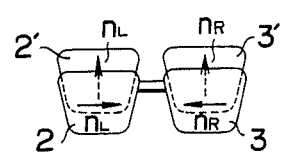
FIG. 13 is a perspective view showing another embodiment of liquid crystal spectacles according to the present invention.

By way of example, as shown in FIG. 13, it is possible to construct the lens assembly without a polarization plate by combining the liquid crystal lenses 2, 3 shown in FIG. 5A with the liquid crystal lenses 2', 3' shown in FIG. 10A, both lenses having their molecules oriented to perpendicularly intersect each other, thus obtaining much brighter spectacles.

In addition, a part of a cell in the form of lens in which liquid crystals are contained may be formed using an ordinary spherical lens and it may be possible, of course, to use a lens in other forms such as a Fresnel lens or an aspherical lens.

Nematic liquid crystal is preferably selected. Liquid crystal practically has the disorder or fluctuation in the molecular orientation as shown by the following:

$$S = \tfrac{1}{2} <3 \cos^2 \theta - 1>$$

where S is an order parameter of the molecular orientation. The liquid crystal molecular directors described so far have an averaged direction. At the same time, this means that the mirror symmetry in the present invention also includes deviation in a set direction of the same extent as the above.

The foregoing is described with reference to typical examples of liquid crystal spectacles, not limited particularly thereto. It will be further understood by those skilled in the art that the present invention is applicable to a binocular, binocular microscope, stereoscopic camera, video camera for a stereotelevision, distance sensor, optical pickup and the like which are constructed by a pair of lens systems of stereoscopic parallax nature, as optical instruments of stereoscopic parallax nature.

Figure 17:
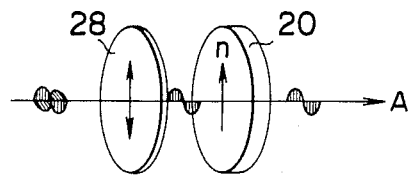
FIG. 17 is a perspective view showing a combination of a liquid crystal lens and a polarization plate.

It is to be noted that the present invention is also applicable to a focal length variable lens having two focuses, as is well known, by switching light rays incident upon the liquid crystal lens 20 (FIG. 17) between ordinary rays and extraordinary rays with the polarizing plate 28 rotated by 90° with respect to the optical axis A.

Figure 14A:
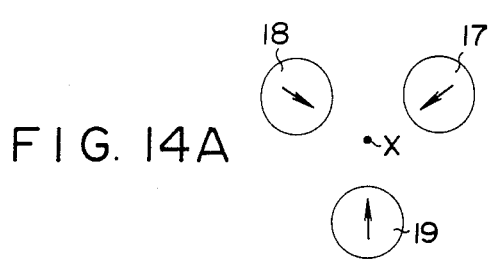
FIGS. 14A and B are front views showing modifications of an optical instrument according to the present invention.
Figure 14B:
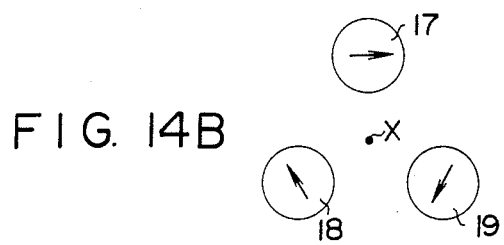
Figure 15:
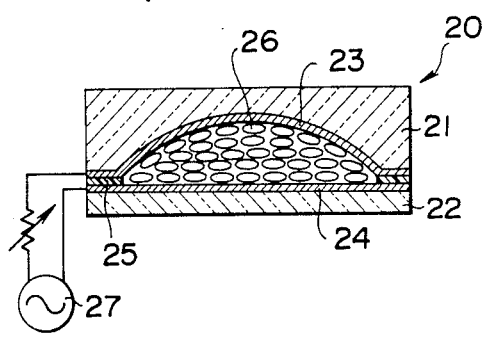
FIG. 15 is a sectional view of a conventional liquid crystal lens.
Figure 16:
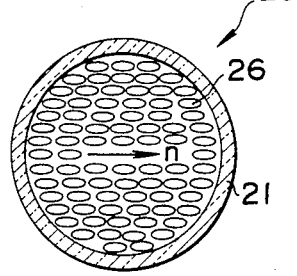
FIG. 16 is a plan view of the liquid crystal lens shown in FIG. 15.

In addition, the case where three liquid crystal lenses are used as a modification of the present invention, will be described with reference to FIGS. 14A and B. In this case, liquid crystal molecular directors within liquid crystal lenses 17, 18, 19 may be arranged so as to have directions to achieve respectively an equivalent operation according to optical instruments with respect to the axis of symmetry X which is at the center of three optical systems employing liquid crystal lenses (rotational symmetry with respect to the X axis according to the number of liquid crystal lenses). Specifically, FIG. 14A shows a structure in which the liquid crystal molecular directors are arranged to be directed to the axis of symmetry X and FIG. 14B shows a structure in which the directors are arranged to be directed clockwise perpendicularly to the axis of symmetry X.

It does not matter, of course, that a plurality of liquid crystal lenses are different in size.

What is claimed is:

1. A stereoscopic optical instrument utilizing liquid crystals; comprising
left and right liquid crystal lenses which are incorporated into said optical instrument such that left and right liquid crystal molecular directors within said left and right lenses are in mirror symmetry with respect to a plane of symmetry which passes through the middle point of the center line connecting the centers of said left and right lenses and whose normal line is said center line.

2. An optical instrument according to claim 1, in which said left and right liquid crystal molecular directors are arranged so as to be directed toward said plane of symmetry.

3. An optical instrument according to claim 1, in which said left and right liquid crystal molecular directors are arranged so as to be in the direction going away from said plane of symmetry.

4. An optical instrument according to claim 1, in which said left and right liquid crystal molecular directors are arranged so as to be in parallel with the vertical line passing through said middle point in said plane of symmetry.

5. An optical instrument according to claim 1, in which said left and right liquid crystal lenses are formed by combining first left and right lenses having liquid crystal molecular directors which are arranged so as to be directed toward said plane of symmetry or to be in the direction going away from said plane of symmetry with second left and right lenses having liquid crystal molecular directors which are arranged so as to be in parallel with a vertical line passing through the middle point in said plane of symmetry.

6. An optical instrument according to claim 1, in which said left and right liquid crystal lenses are combined with their respective polarizing filters each having a transmission axis and an absorption axis, in such a manner that neither of the left and right pairs of the transmission axis directions and the absorption axis directions are parallel.

7. A stereoscopic optical instrument utilizing liquid crystals; comprising a plurality of optical systems causing stereoscopic parallax in the eyes which systems are arranged so as to be in rotational symmetry relationship with respect to the axis of symmetry located at the center of the optical systems, each system including liquid crystal molecular directors which are arranged so as to be directed toward said axis of symmetry or in the direction perpendicular to said axis of symmetry.

8. An optical instrument according to claim 7, further comprising electrical means coupled to said lenses for rotating said directors.

* * * * *

UNITED STATES PATENT AND TRADEMARK OFFICE
CERTIFICATE OF CORRECTION

PATENT NO. : 4,781,440
DATED : November 1, 1988
INVENTOR(S) : Akitoshi Toda

It is certified that error appears in the above-identified patent and that said Letters Patent is hereby corrected as shown below:

Column 5, line 36, "eyes" should be -- the eyes --.

Column 6, line 61, "$\theta_{60}$" should be -- $\theta\alpha$ --.

Signed and Sealed this

Twelfth Day of June, 1990

Attest:

HARRY F. MANBECK, JR.

Attesting Officer

Commissioner of Patents and Trademarks